United States Patent [19]
Sato

[11] Patent Number: 6,125,411
[45] Date of Patent: Sep. 26, 2000

[54] SYSTEM STORING PLURAL I/O ARRANGEMENT INFORMATION WHEREIN EACH I/O ARRANGEMENT INFORMATION CORRESPONDING TO EACH OPERATING SYSTEM IS CREATED IN RESPONSE TO MORE THAN TWO OPERATING SYSTEMS

[75] Inventor: Kiichi Sato, Hadano, Japan

[73] Assignee: Hitachi, Ltd., Tokyo, Japan

[21] Appl. No.: 09/029,888

[22] PCT Filed: Sep. 13, 1995

[86] PCT No.: PCT/JP95/01813

§ 371 Date: Mar. 12, 1998

§ 102(e) Date: Mar. 12, 1998

[87] PCT Pub. No.: WO97/10549

PCT Pub. Date: Mar. 20, 1997

[51] Int. Cl.[7] ...................................................... G06F 13/14
[52] U.S. Cl. ................................... 710/38; 710/2; 710/3; 710/8; 710/15; 710/16; 710/17
[58] Field of Search .................. 710/2, 3, 8, 15, 710/16, 17, 38; 709/104

[56] References Cited

U.S. PATENT DOCUMENTS

5,414,851  5/1995  Brice, Jr. et al. ...................... 709/104
5,572,694  11/1996 Uchino ........................................ 709/1
5,600,805  2/1997  Fredericks et al. .......................... 710/5
5,640,603  6/1997  Meritt et al. ............................... 710/38
5,717,950  2/1998  Yamaguchi et al. ......................... 710/8

Primary Examiner—Thomas C. Lee
Assistant Examiner—Ilwoo Park
Attorney, Agent, or Firm—Mattingly, Stanger & Malur, P.C.

[57] ABSTRACT

In an electronic computer system in which a plurality of OSs are operated, a plurality of input-output arrangement information defined in response to each of a plurality of OSs and a correspondence table indicative of a correspondence relationship between each OS and each input-output arrangement information are created previously and stored in a control information storage means. When an input-output request is issued from an arbitrary OS, the central processing unit identifies the corresponding OS, and recognizes input-output arrangement information corresponding to the identified OS based on the correspondence table. Then, the central processing unit executes an input-output processing based on the recognized input-output arrangement information. According to the present invention, since one electronic computer system becomes able to use a plurality of input-output arrangement information at the same time, the maximum number of input-output arrangements can be distributed to each OS so that the data processing capability of the whole system can be improved considerably.

19 Claims, 9 Drawing Sheets

SYSTEM STORING PLURAL I/O ARRANGEMENT INFORMATION WHEREIN EACH I/O ARRANGEMENT INFORMATION CORRESPONDING TO EACH OPERATING SYSTEM IS CREATED IN RESPONSE TO MORE THAN TWO OPERATING SYSTEMS

TECHNICAL FIELD

The present invention relates to an electronic computer system which is able to use a plurality of input-output arrangement information in a single system at the same time.

BACKGROUND ART

In a present computer architecture, it is customary that a hardware executes a control concerning input-output processing such as a selection of an input-output path (channel path) up to an input-output unit (I/O) or a queue processing executed when a channel path is in use.

Under such computer architecture, the input-output processing in the electronic computer system specifies a channel path through which an instruction processor (IP) and an input-output processor (IOP) of the electronic computer system reaches the I/O and an I/O based on input-output arrangement information previously created in response to the system arrangement, and executes an input-output operation.

Heretofore, in such an electronic computer system, there has been set one input-output arrangement information for one system. Then, an upper limit of the number of input-output arrangements defined by this input-output arrangement information is previously determined from a standpoint of a computer architecture. Accordingly, the electronic computer system executes processing by using input-output arrangements that can be defined by one input-output arrangement information.

When a plurality of operating systems (OS) are operated in such an electronic computer system, a processor resource within the system is divided logically thereby to operate each OS. In this case, since the hardware for executing the input-output processing defined by the input-output arrangement information also is divided and distributed, each OS can monopolize only a part of the input-output arrangement defined by the input-output arrangement information. In addition, since the number of input-output arrangements that can be defined by the input-output arrangement information is limited, even if the number of the input-output arrangements of the electronic computer system increases, the increased input-output arrangements cannot be supported, which becomes a factor that limits the data processing capability.

As a means for solving the aforementioned problem, to known that the hardware of an electronic computer system can be physically divided, whereby one electronic computer system is operated as two electronic computer systems which are made independent physically.

Figure 1:
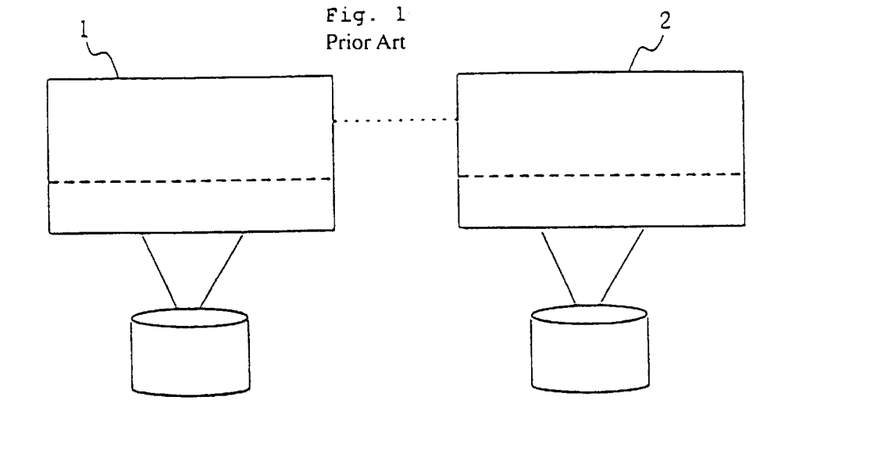
FIG. 1 is a block diagram showing an electronic computer system according to the prior art.

FIG. 1 is a block diagram showing an electronic computer system obtained in such an operation mode. In FIG. 1, reference numerals 1, 2 denote two electronic computer systems which are made independent respectively.

Figure 2:
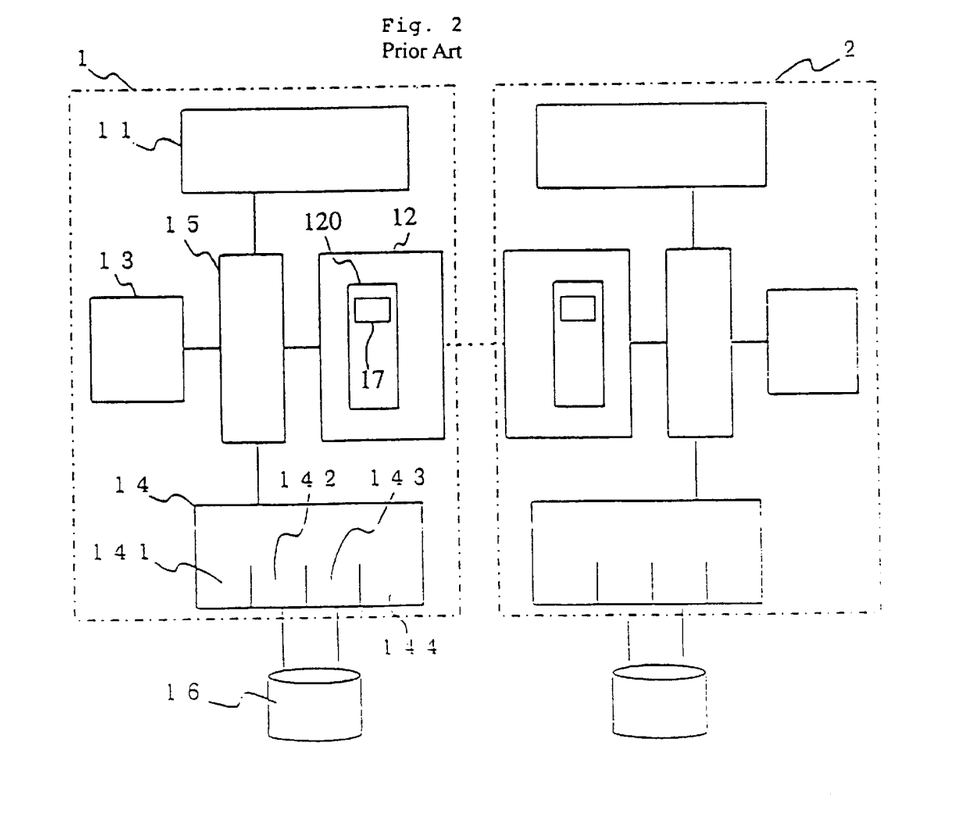
FIG. 2 is a block diagram specifically showing the electronic computer system according to the prior art.

FIG. 2 is a block diagram specifically showing the electronic computer system 1 in FIG. 1. In FIG. 2, the electronic computer system 1 comprises an instruction processor (IP) 11, a main storage (MS) 12, a service processor (SVP) 13, an input-output processor (IOP) 14 and a system controller (SC) 15 which combines these processors 11, 13, 14 and the MS 12. The IOP 14 includes channels CH 141, 142, 143, 144 which are controlled by the IOP 14. An input-output unit (I/O) 16 is connected to the channels CH 142, 143. The MS 12 includes a control information storage area 120. In the control information storage area 120, there is stored input-output arrangement information 17 inherent in the electronic computer system 1 which contains information specifying a channel path ranging from the IP 11 to the I/O 16 and information specifying the I/O 16.

When a data fetch request, for example, is issued from the OS 18 to the I/O 16, the IP 11 instructs a data fetch to the IOP 14. The IOP 14 specifies the I/O 16 with reference to the input-output arrangement information 17, selects either the channel CH 142 or the channel CH 143 which is connected to the I/O 16, and fetches data by activating the I/O 16 through the selected channel CH.

This is also true in the electronic computer system 2.

When one electronic computer system is operated as the two electronic computer systems which are made independent physically, each electronic computer system is able to execute the input-output processing by using different input-output arrangement information inherent in each system. Then, since each electronic computer system uses different input-output arrangement information, each system can use input-output arrangements that can be respectively defined by the input-output arrangement information.

Accordingly, if each OS is operated in each electronic computer system, each OS can monopolize all hardware of each electronic computer system, and can improve a data processing capability as compared with a case in which a plurality of OSs are operated in one electronic computer system.

However, when the electronic computer system is operated as described above, the respective computer systems become different from each other, and hardware which are monopolized by the two systems are not compatible with each other. As a result, with respect to the input-output arrangement information, only the input-output arrangement monopolized by each system can be defined, and it is not possible to create input-output arrangement information which defines the input-output arrangement such that other systems can use the input-output arrangement monopolized by one system.

Accordingly, the input-output arrangement cannot be changed between the two systems, and one more input-output arrangement in one system cannot be used by the other system. There is then the problem that the input-output arrangement cannot be defined freely in the electronic computer system.

An object of the present invention is to provide an electronic computer system which is not divided physically and is not operated as a plurality of electronic computer systems, and in which one electronic computer system becomes able to use a plurality of input-output arrangement information thereby to considerably improve the data processing capability.

DISCLOSURE OF INVENTION

According to the present invention, there is provided an electronic computer system in which a plurality of operating systems are operated. In an electronic computer system which includes a central processing unit for executing a plurality of instructions, a plurality of channels controlled by the central processing unit, and a plurality of input-output units connected to an arbitrary channel of a plurality of channels and in which the central processing unit executes an input-output processing based on input-output arrangement information which defines the input-output arrangement, the central processing unit includes a memory means for storing a plurality of input-output arrangement information created in response to more than two operating systems in a plurality of operating systems, a supervisory means for supervising whether an input-output request is issued from a plurality of operating systems or not, a recognizing means for identifying an operating system when the input-output request is issued from an arbitrary single operating system and recognizing input-output arrangement information corresponding to the operating system, and an input-output executing means for executing input-output processing with reference to the recognized input-output arrangement information.

According to the present invention, since the input-output arrangement information is created in response to more than two OSs and the system is able to selectively use the input-output arrangement information in response to the input-output request issued from the arbitrary OS, one electronic computer system becomes able to use a plurality of input-output arrangement information simultaneously. Accordingly, when a plurality of OSs are operated, if a plurality of different input-output arrangement information are used, then it becomes possible to distribute input-output arrangement information that can be defined as input-output arrangement information among the OSs. Also, when the system has more input-output arrangements, all OSs which are operated within the system become able to use this increased input-output arrangement, and hence the input-output arrangement can be changed freely.

BEST MODE FOR CARRYING OUT THE INVENTION

Electronic computer systems according to embodiments of the present invention will hereinafter be described in detail with reference to the drawings.

Figure 3:
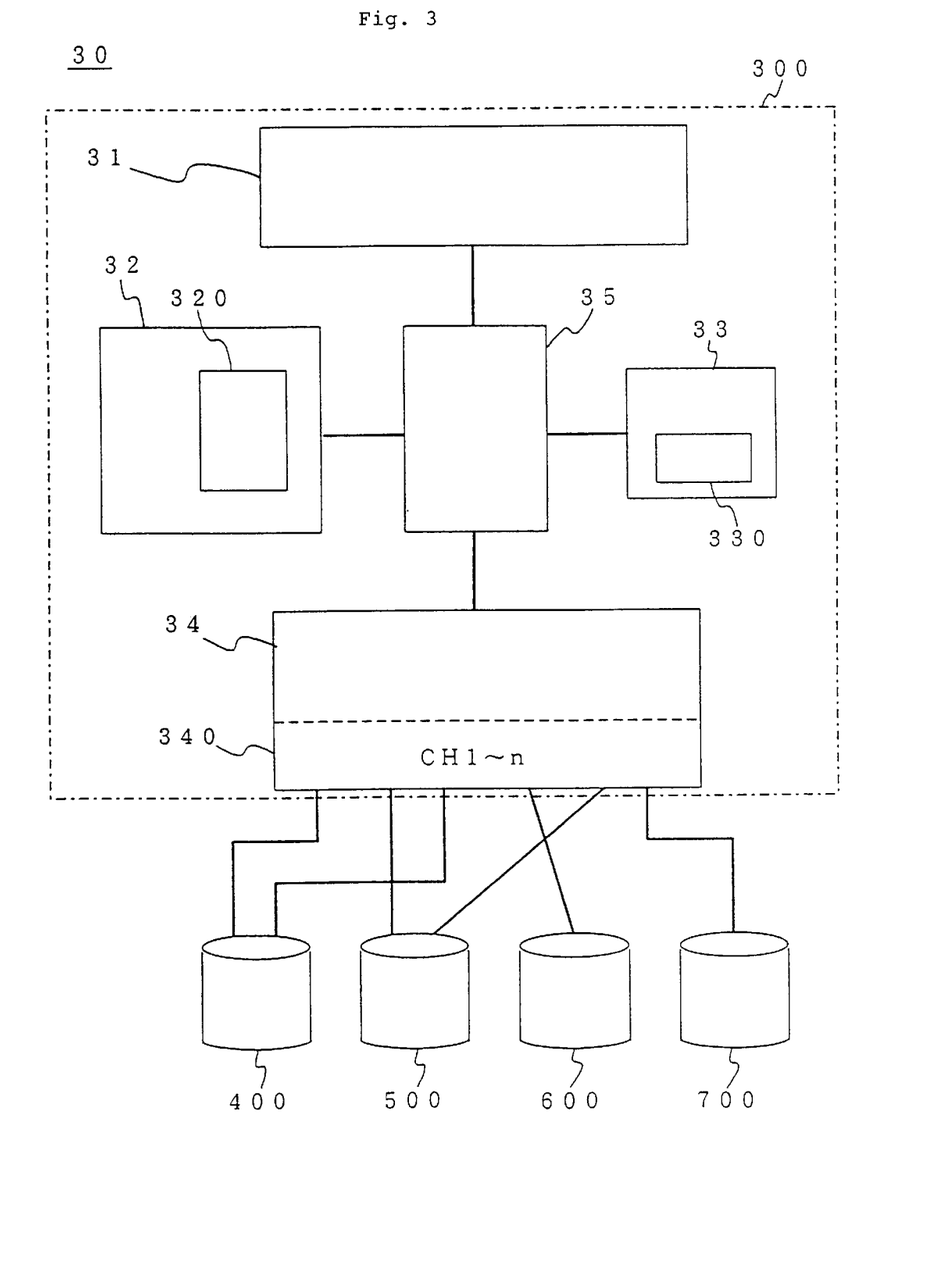
FIG. 3 is a block diagram showing an electronic computer system according to an embodiment of the present invention.

FIG. 3 is a block diagram showing an electronic computer system according to an embodiment of the present invention. In this embodiment, an electronic computer system 30 comprises an instruction processor (IP) 31 for executing various kinds of instructions, a main storage (MS) 32 which stores programs and processing data, a service processor (SVP) 33 for setting system arrangement information, an input-output processor (IOP) 34 for executing an input-output instruction, and a system controller (SC) 35 for combining these processors 31, 33, 34 and the MS 32. The IOP 34 includes a CH group 340 which comprises channels (CH) 1 to n controlled by the IOP 34. These channels CH are connected with input-output units (I/O) 400, 500, 600, 700.

As described above, each I/O is connected to the system through the channel CH, and information used by the system to specify the I/O and information for specifying a channel path ranging from the system through the CH to the I/O (e.g. input-output arrangement information which defines the input-output arrangement, such as a physical connection relationship between the CH and the I/O) are created by using an exclusively-designed program before the system is operated, and stored in a file 330 within the SVP 33. Then, when the system starts operating or when an initial microprogram load (IMPL) is executed, the input-output arrangement information stored in this file 330 is extended by the SVP 33 such that it can be used by the hardware of the system, and then stored in a control information storage area 320 provided within the MS 32.

In this embodiment, two OSA OSB are independently operated in such electronic computer system 30. In the electronic computer system 30, before the system is operated, there are created input-output arrangement information A and B in which input-output arrangements (SYSTEM-1 and SYSTEM-2) inherent in the respective OSs 36, 37 are defined, and the input-output arrangement information A, B are stored in the control information storage area 320.

Figure 4:
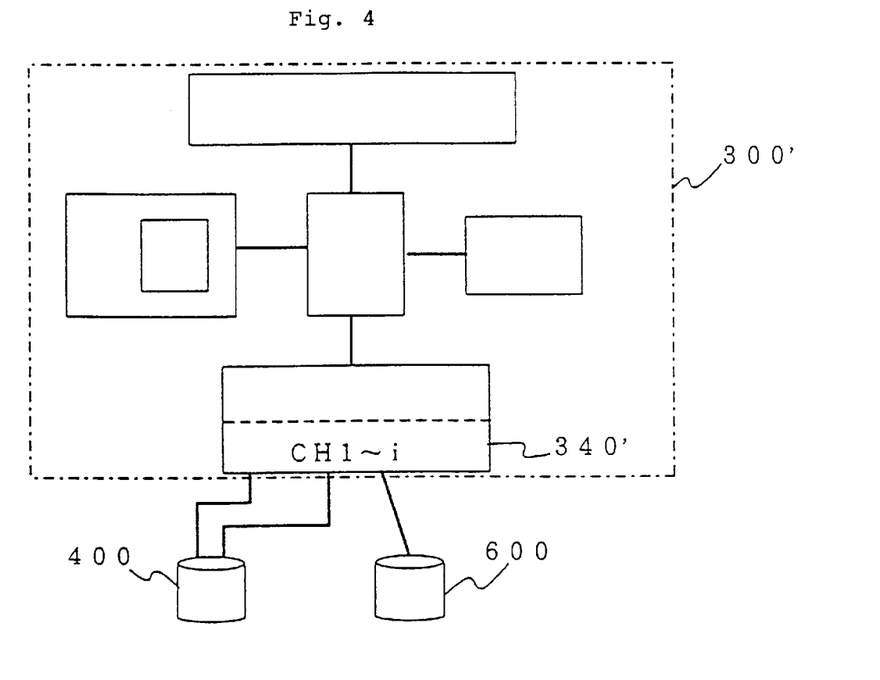
FIG. 4 is a block diagram showing a SYSTEM-1 defined by input-output arrangement information A according to the embodiment of the present invention.
Figure 5:
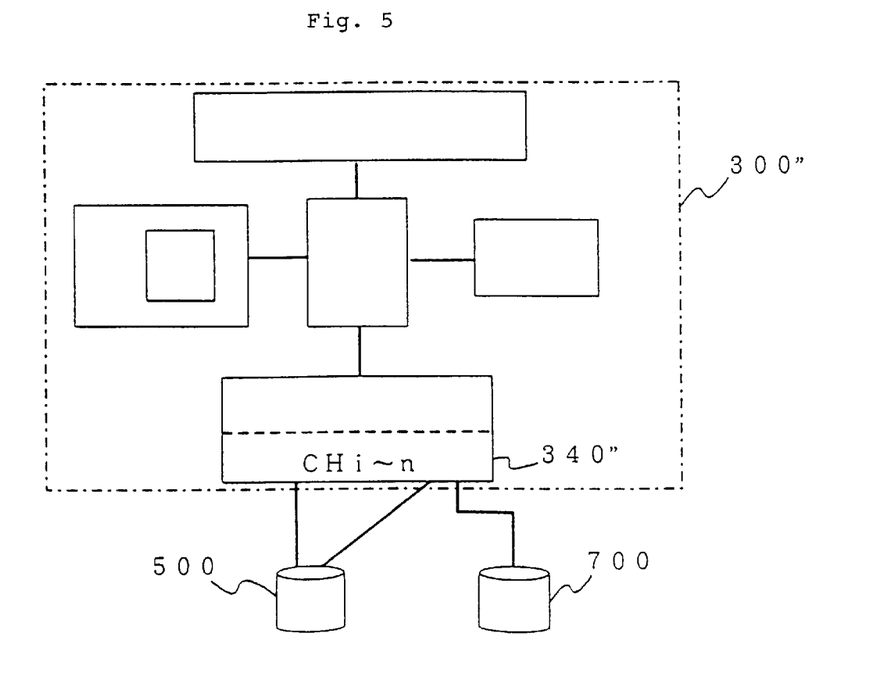
FIG. 5 is a block diagram showing a SYSTEM-2 defined by input-output arrangement B according to the embodiment of the present invention.

FIGS. 4 and 5 are block diagrams showing the SYSTEM-1 and the SYSTEM-2 which are respectively defined by the input-output arrangement information A, B.

In the following explanation, let it be assumed that the IP 31, the MS 32, the SVP 33, the IOP 34 and the SC 35 in the electronic computer system 30 are intergrated in one central processing unit (CPU) 300 and execute a variety of processing.

FIG. 4 is a block diagram showing the SYSTEM-1 defined by the input-output arrangement information A corresponding to the OSA.

In FIG. 4, the SYSTEM-1 comprises a CPU 300', a CH group 340' and I/Os 400 and I/O 600 which are connected to these channels CH. The CH group 340' is defined as being composed of channels CH 1 to i (i<n) of the CH group 340 in the electronic computer system 30.

When the system is seen from the OSA, it seems that the electronic computer system 30 is arranged in the same way as the SYSTEM-1 is arranged.

FIG. 5 is a block diagram showing the SYSTEM-2 defined by the input-output arrangement information B corresponding to the OSB.

In FIG. 5, the SYSTEM-2 comprises a CPU 300", a CH group 340" and an I/O 500 and an I/O 700 which are connected to the channels CH. The CH group 340" is defined as being composed of channels CHj to n (j<n) of the CH group 340 in the electronic computer system 30.

When the system is seen from the OSB, it seems that the electronic computer system 30 is arranged in the same way as the SYSTEM-2 is arranged.

Figures 6, 7:
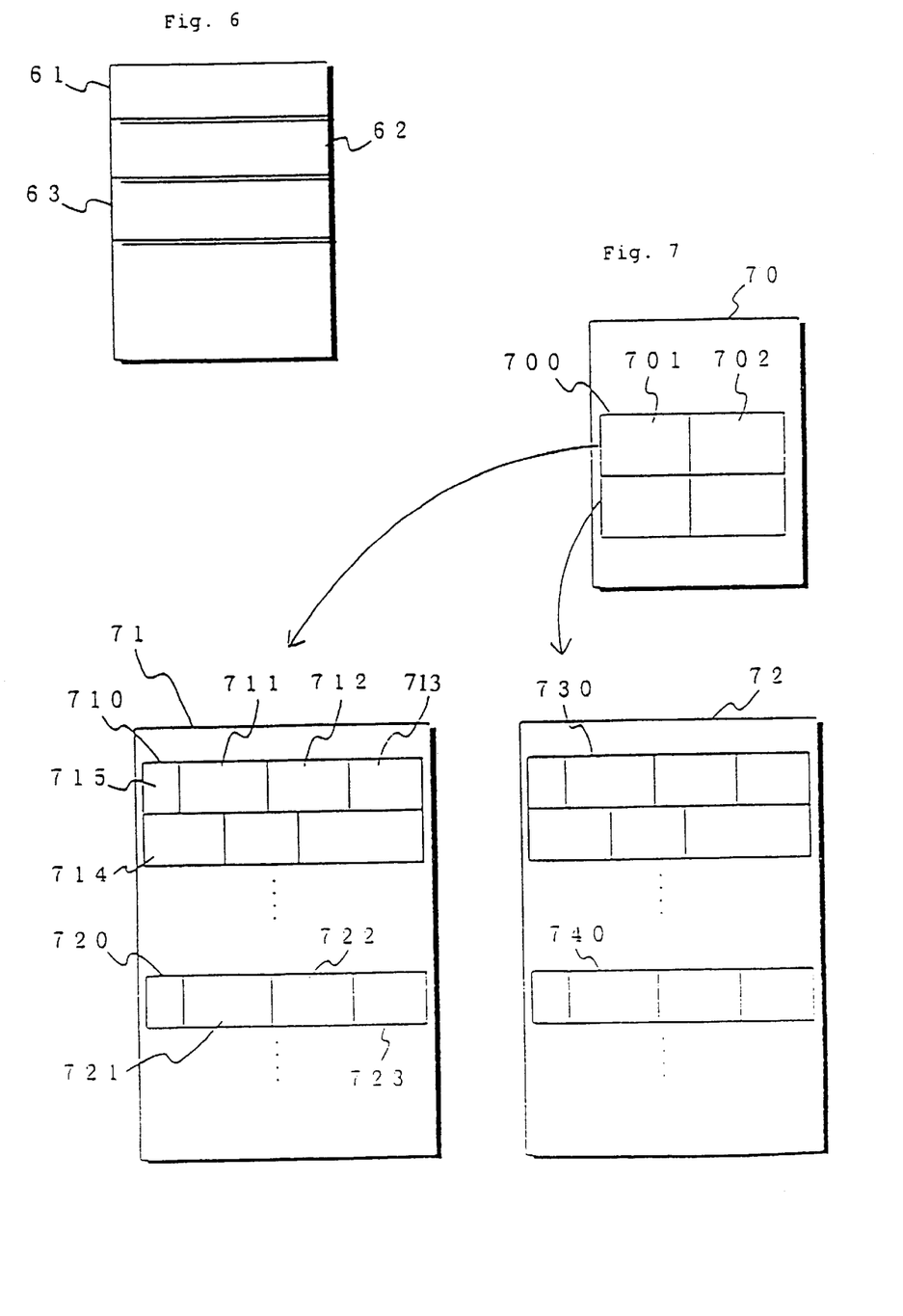
FIG. 6 is a diagram showing the manner in which input-arrangement information A, B are stored in control information storage areas.
FIG. 7 is a diagram showing a table provided within the input-output arrangement information according to the embodiment of the present invention.

FIGS. 6 and 7 show the manner in which the input-output arrangement information A, B are stored in the control information storage area 320, and an example of a table provided in each input-output arrangement information.

In FIG. 6, common information C which does not depend on the respective input-output arrangement information A, B is stored in an area 61 within the control information storage area 320, and the input-output arrangement information A, B are respectively stored in the areas 62 and 63. The common information C contains mainly, in addition to information used by the system, a correspondence table which shows a correspondence relationship between the OSs OSA, OSB and the input-output arrangement information A, B. This correspondence table is created by the SVP 33, and this correspondence table also is stored in the control information storage area 320 as common information when the input-output arrangement information is stored in the control information storage area 320.

FIG. 7 shows a table provided within each information. Although there exist other tables within each information in addition to the above-mentioned table, FIG. 7 shows only the portion concerning the present discussion.

In FIG. 7, reference numeral 70 denotes common information C which contains a correspondence table 700 showing a correspondence relationship between the OSs OSA, OSB and the input-output arrangement information A, B.

In the correspondence table 700, there are stored a pair of an ID number 701 assigned to each OS and an ID number 702 assigned to input-output arrangement information corresponding to that OS.

Reference numeral 71 designates input-output arrangement information A in which there are provided an I/O table 710 and a CH table 720.

The I/O table 710 is provided at every I/O within the SYSTEM-1 and which stores information 711 indicative of whether each I/O is available or not, an I/O number 712 assigned to each I/O within the SYSTEM-1, a CH number 713 assigned to a channel CH to which each I/O is connected within the SYSTEM-1, a physical I/O address 714 used to access each I/O through the channel CH and flag information (V) 715 indicative of whether the I/O information is valid or not. When flag information V=1, this indicates that information of that table is valid. When V=0, this indicates that information is invalid.

The CH table 720 also is provided at every CH within the SYSTEM-1 and stores a CH number 721 assigned to each channel CH, a physical CH number 722 (this physical CH number is the number assigned to all channels CH within the CH group) used to physically specify each channel CH, and characteristic information 723 indicative of a characteristic of each channel CH.

With respect to the input-output arrangement information B denoted by reference numeral 72, there are provided an I/O table 730 and a CH table 740 similarly to the input-output arrangement information A71.

Next, the manner in which each I/O is accessed by using the input-output arrangement information will be described.

Figure 8:
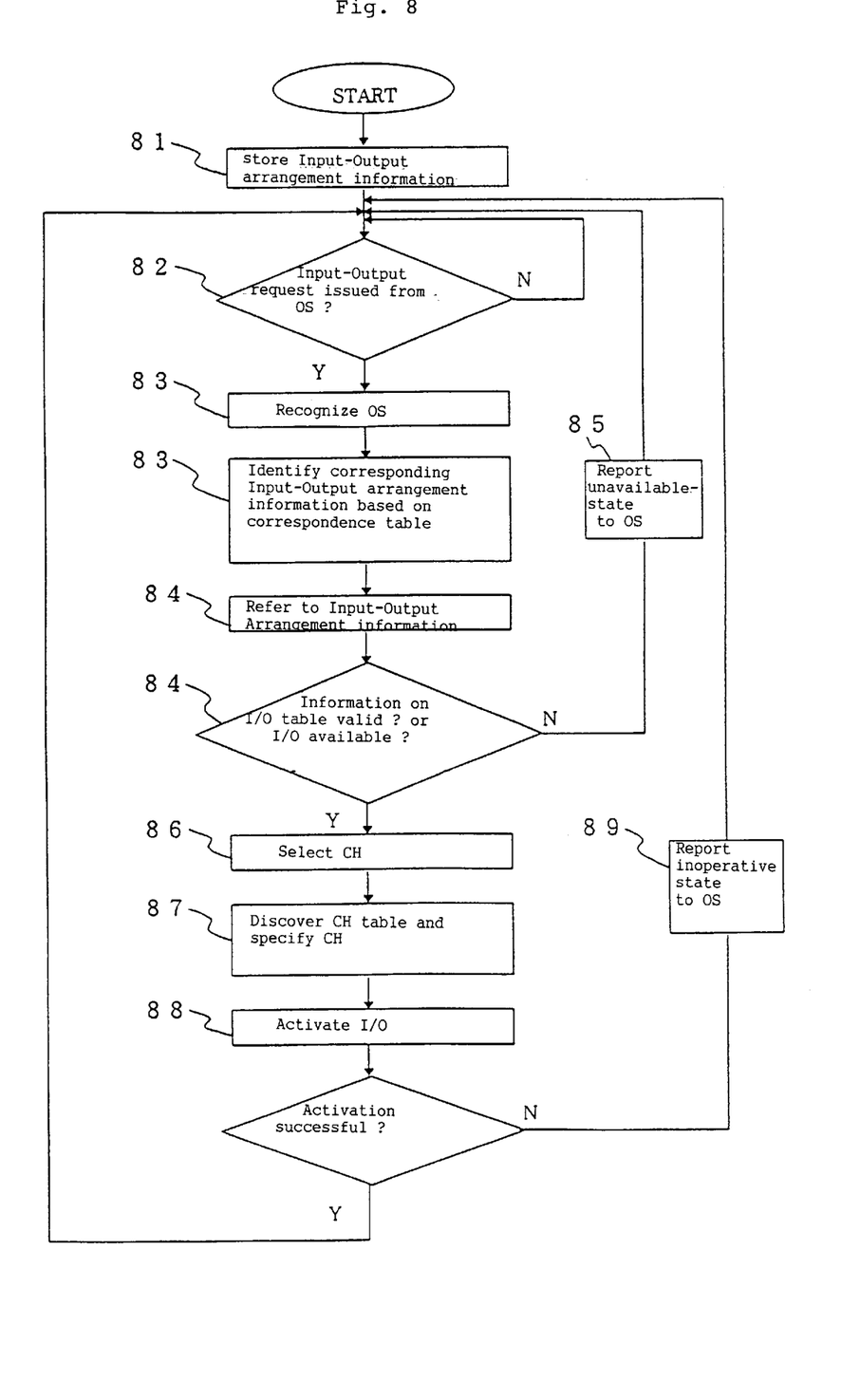
FIG. 8 is a flowchart to which reference will be made in explaining the manner in which an input-output request is executed in the electronic computer system according to the embodiment of the present invention.

FIG. 8 is a flowchart to which reference will be made in explaining the manner in which an input-output request is executed in the electronic computer system 30 according to this embodiment.

As shown in FIG. 8, when input-output arrangement information A, B are stored in the control information storage area 320 as the system starts operating (step 81), the CPU 300 constantly supervises whether or not an input-output request is issued from the OSA or the OSB (step 82). When the OSA, for example, issues the input-output request to the I/O 400, the OSA instructs the I/O number assigned to the I/O 400 and the contents of the input-output processing, and issues the input-output request. When the input-output request is issued from the OSA, the CPU 300 recognizes the request from the OSA and identifies based on the correspondence table 700 provided in the common information C70 within the control information storage area 320, that the input-output arrangement information A corresponds to the OSA (step 83). Then, based on the input-output arrangement information A71, the central processing unit discovers a table corresponding to the I/O 400 of the I/O table 710 from the designated I/O number, and determines on the basis of the information 711 and the flag information 715 within the table whether or not the information in that table is valid, or whether or not the I/O 400 is available (step 84). If the information in the table is invalid or the I/O 400 is unavailable, then the central processing unit reports the fact that the I/O is unavailable to the OSB (step 85). If the information on the table is valid and the I/O 400 is available, then the central processing unit decides a channel CH to which the I/O 400 is connected on the basis of the CH number 713 within the table, and selects a channel CH which is used from the decided channels CH (step 86). Then, the central processing unit extracts a corresponding one of the CH table 720 from the CH number of the selected channel CH, and specifies the corresponding channel CH from the CH group 340 based on the physical CH number 722 within the table (step 87). Then, the I/O 400 is activated through this channel CH and accessed (step 88). As an address used when this I/O 400 is accessed, there is used an I/O address 714 within the table. Moreover, a data transfer is executed in response to the characteristic of each channel CH indicated on the characteristic information 723 within the CH table 720. Further, if the activation of the I/O 400 is failed, then the fact that the I/O 400 is inoperative is reported to the OSA.

An input-output request from the OSA to the I/O 600 and an the input-output request from the OSB to the I/O 500, the I/O 700 are executed similarly.

The manner in which the electronic computer system is operated when more IOPs and the I/Os are provided much more in the electronic computer system 30 will be described next.

Figure 9:
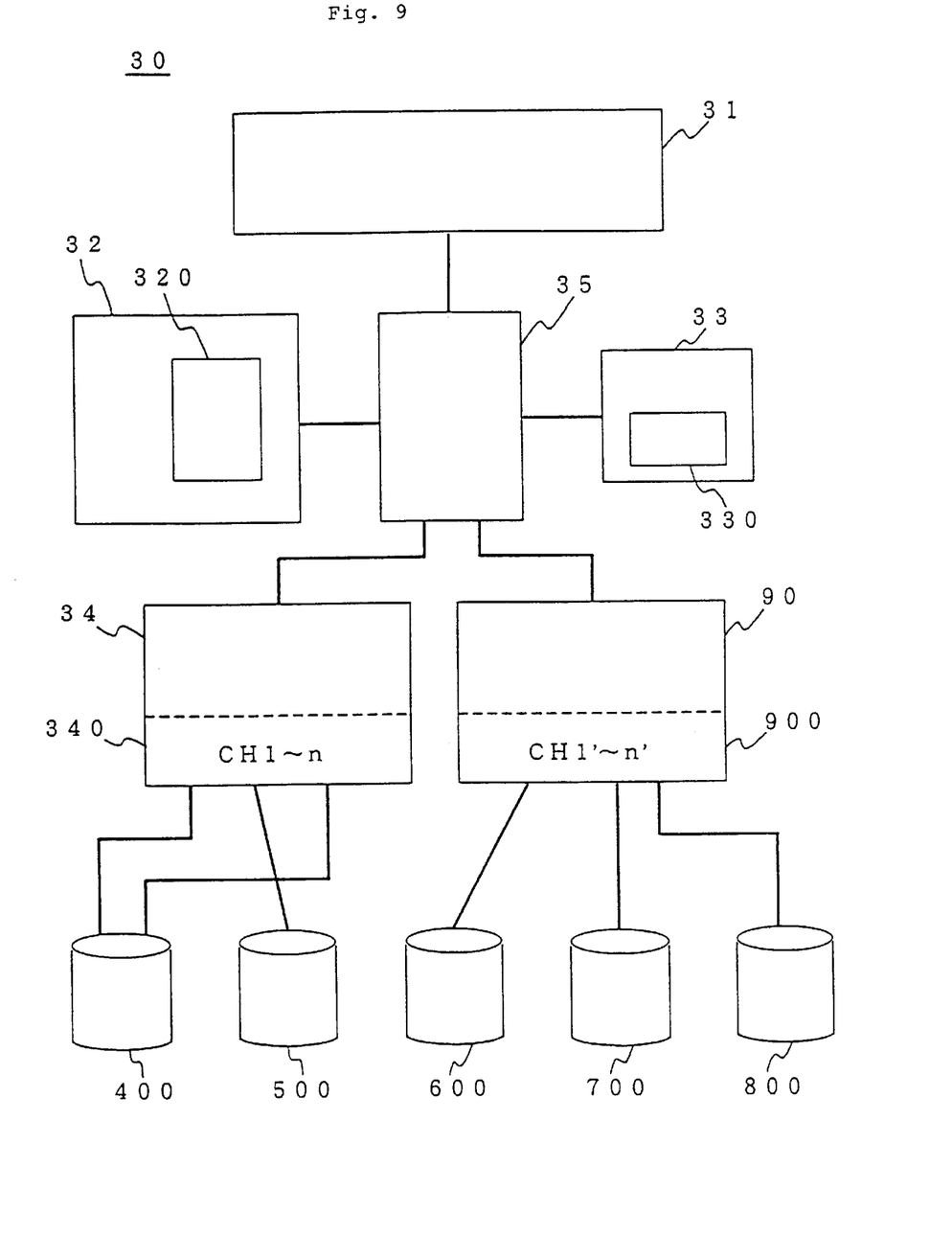
FIG. 9 is a block diagram showing an electronic computer system according to another embodiment of the present invention.

FIG. 9 is a block diagram showing the electronic computer system 30 having more IOPs and I/Os. In FIG. 9, similarly to FIG. 3, the electronic computer system 30 comprises the IP 31 for executing a variety of instructions, the MS 32 in which there are stored programs and processed data, the SVP 33 for setting system arrangement information and the like, and the IOP 34 for executing an input-output instruction. Further, additional IOP 90 is provided, and the SC 35 for combining these processors 31, 33, 34, 90 and the MS 31.

The IOP 34 and the IOP 90 have the same configuration with each other. In the same way as the IOP 34 includes the CH group 340 comprising the channels CH1 to n, the IOP 90 also includes a CH group 900 comprising channels CH1' to n' which are controlled by the IOP 90. These channels CH are connected with I/Os 400, 500, 600, 700, and furthermore, I/O 800. Incidentally, with respect to the I/Os 600, 700, the physical connection is changed with the increase of the IOP 90, and these units are connected to the CH group 900 within the IOP 90.

As described above, in the electronic computer system 30, the two OSs OSA, OSB are operated independently. Accordingly, after the IOP 90 and I/800 are provided more, before the system is operated, input-output arrangement information X, Y which define new respective input-output arrangements (SYSTEM-10 and SYSTEM-20) relative to the respective OSs OSA, OSB are created by exclusively-designed programs, and then stored in a file 330 within the SVP 33. Then, when the system is started to be operated, the hardware of the system is expanded by the SVP 33 into the form that can be used, and then stored in a control information storage area 320 provided within the MS 32.

Figure 10:
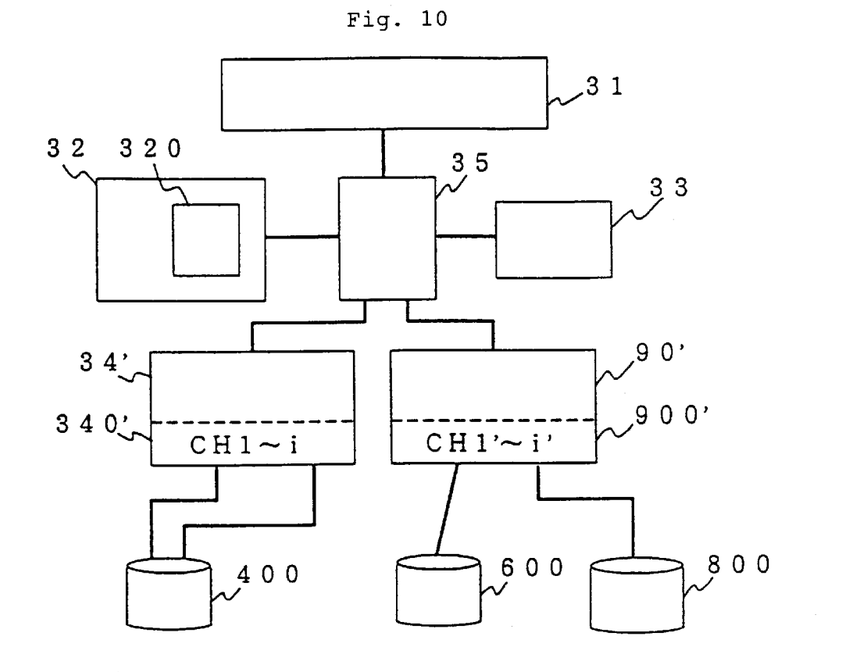
FIG. 10 is a block diagram showing a SYSTEM-10 defined by input-output arrangement information X according to another embodiment of the present invention.
Figure 11:
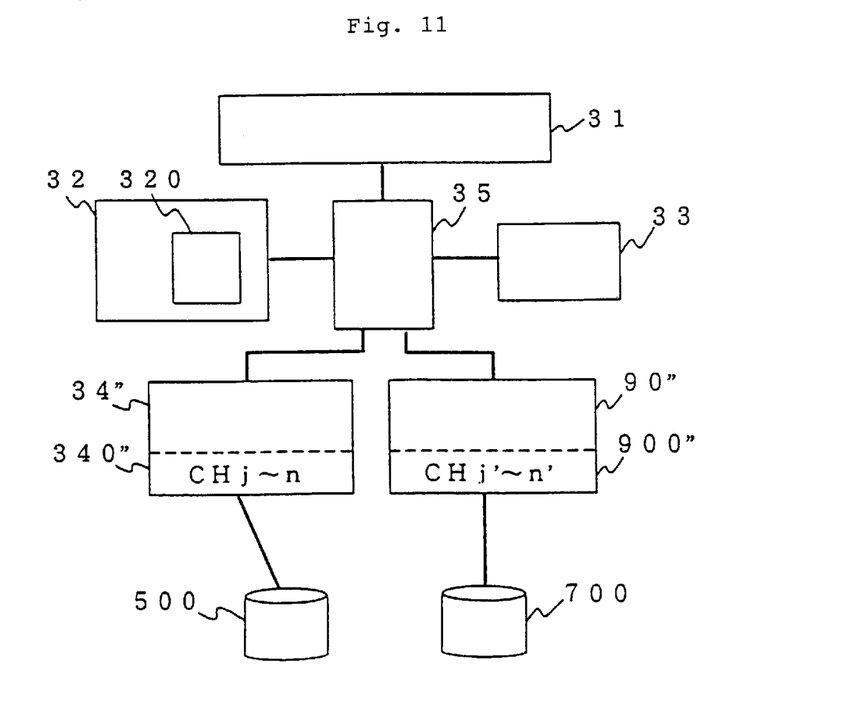
FIG. 11 is a block diagram showing a SYSTEM-20 defined by input-output arrangement information Y according to another embodiment of the present invention.

FIGS, 10 and 11 are block diagrams showing a SYSTEM-10 and a SYSTEM-20 defined by the input-output arrangement information X, Y.

In FIG. 10, the SYSTEM-10 comprises the IP 31, the MS 32, the SVP 33, IOPS 34', 90', the SC 35 for connecting these processors, an I/O 400, an I/O 600 and an I/O 800. In the input-output arrangement information X, the IOP 34' is defined as one which contains a CH group 340' comprising channels CH1 to i of channels CH1 to n within the CH group 340 in the IOP 34. Also, the IOP 90' is defined as one which contains a CH group 900' comprising channels CH1' to i' of channels CH1' to n' within then CH group in the IOP 90.

When the system is seen from the OSA, it seems that the electronic computer system 30 is newly arranged as the SYSTEM-10.

Moreover, in FIG. 11, the SYSTEM-20 comprises the IP 31, the MS 32, the SVP 33, IOPs 34", 90", the SC 35 for connecting these processors, an I/O 500 and an I/O 700. In the input-output arrangement information Y, the IOP 34" is defined as one which contains a CH group 340" comprising channels CHj to n of channels CH1 to n within the CH group 340. Also, the IOP 90" is defined as one which contains a CH group 900" comprising channels CHj' to n' of channels CH1' to n' within the CH group 900.

When the system is seen from the OSB, it seems that the electronic computer system 30 is newly arranged as the SYSTEM-20.

Figure 12:
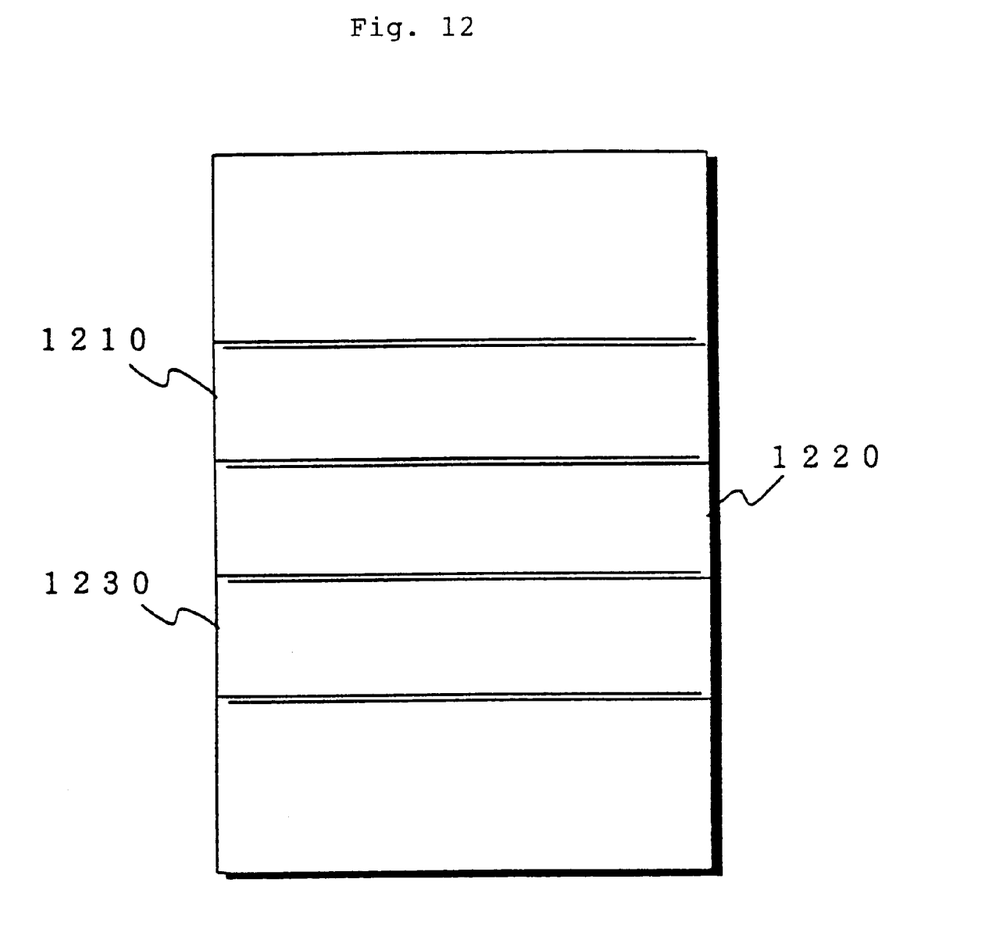
FIG. 12 is a diagram showing the manner in which the input-output arrangement information X, Y are stored in the control information storage areas.

FIG. 12 is a diagram showing the manner in which the input-output arrangement information X, Y are stored in the control information storage area 320.

In FIG. 12, common information Z which does not depend upon the input-output arrangement information X, Y is stored in an area 1210 within the control information storage area 320, and the input-output arrangement information X, Y are respectively stored in areas 1220 and 1230.

Tables provided within each of information X, Y, Z are the same as those shown in FIG. 7. Reference numeral 70 in FIG. 7 corresponds to the common information Z, and reference numerals 71, 73 correspond to the input-output arrangement information X, Y, respectively.

The manner in which each I/O is accessed by using the input-output arrangement information will be described next.

Figure 13:
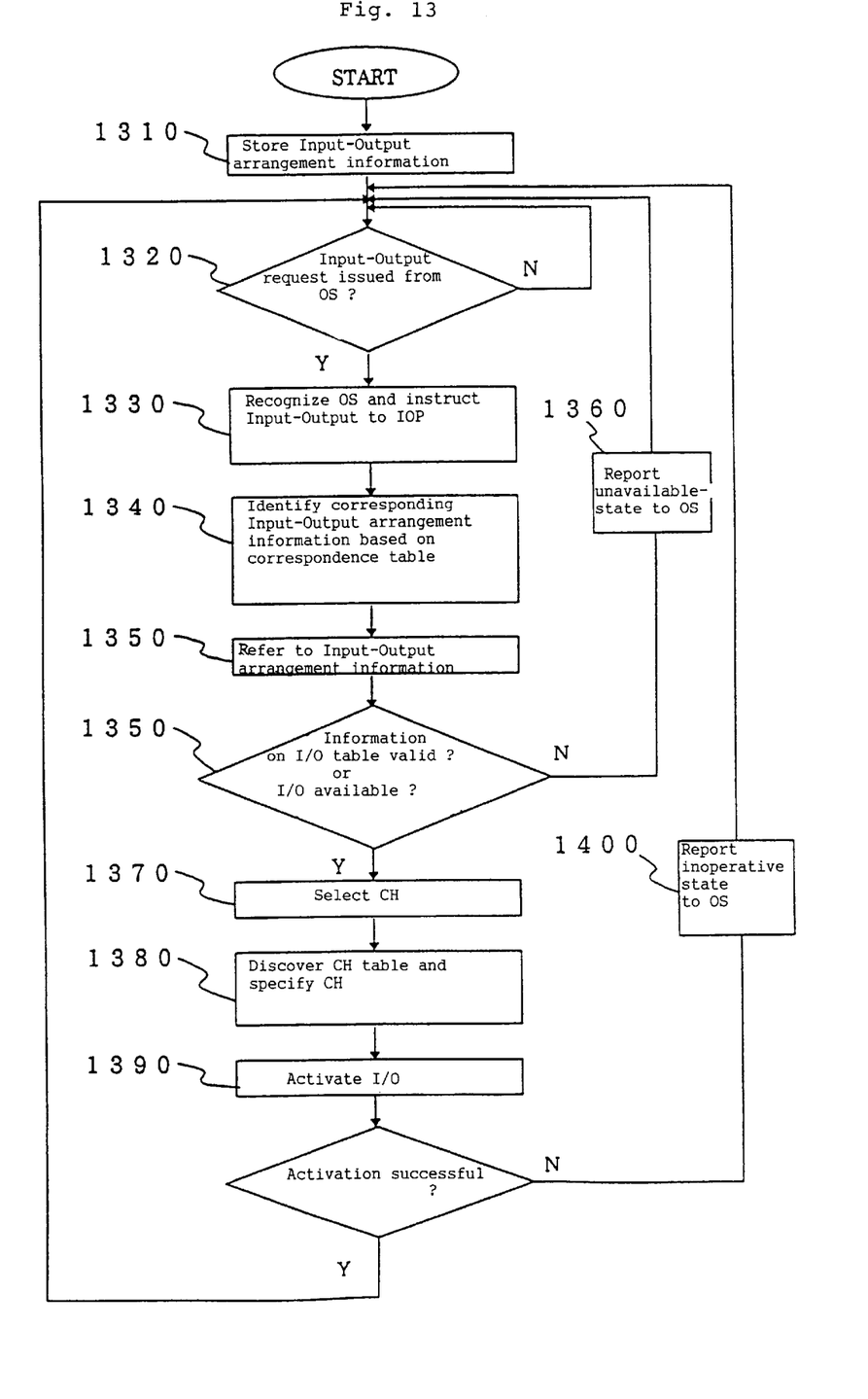
FIG. 13 is a flowchart to which reference will be made in explaining the manner in which the input-output request is executed in the electronic computer system according to another embodiment of the present invention.

FIG. 13 is a flowchart to which reference will be made in explaining the manner in which an input-output request is executed in the electronic computer system 30.

As shown in FIG. 13, when the input-output arrangement information X, Y are stored in the control information storage area 320 as the system is started to operate (step 1310), it is constantly supervised by the IP 31 whether the OSA or the OSB issues the input-output request or not (step 1320). When the OSA, for example, issues an input-output request relative to the I/O 800, the OSA instructs an I/O number assigned to the I/O 800 and contents of the input-output processing, and issues the input-output request. If the OSA issues the input-output request as described above, then the IP 31 instructs the input-output processing to the IOPs 34, 90 together with information indicative of the input-output request from the OSA (step 1330). The IOPs 34, 90 initially identify, based on a correspondence table 700 provided on the common information Z70 within the control information storage area 320, whether the OSA corresponds to the input-output information X or not (step 1340). Then; based on input-output arrangement information X71, the input-output processors extract a table corresponding to the I/O 800 of the I/O table 710 from the designated I/O number, and judge based on information 711 and flag information 715 within the table whether information on such table is valid or not, or whether the I/O 800 is available or not (step 1350). If the information on the table is invalid or the I/O 800 is unavailable, then the input-output processors report the fact that the input/output is unavailable to the OSA (step 1360). If the information on the table is valid and the I/O 800 is available, then the input-output processors identify, based on a CH number 713 within the table, a channel CH to which the I/O 800 is connected, and select a channel CH from the identified channel CH (step 1370). Then, the input-output processors extract a corresponding one of a CH table 720 from the CH number of the selected channel CH, and specify, based on a physical CH number 722 within the table, a corresponding CH from the CH groups 340, 900 (step 1380). Then, the I/O 800 is activated and accessed through this channel CH (step 1390). As an address used to access the I/O 800, there is used an I/O address 714 within the table. Also, a data transfer is executed in response to a characteristic of each channel CH shown in characteristic information 723 within the CH table 720.

An input-output request from the OSs OSA, OSB to other I/Os is executed similarly.

While the present invention is specifically described so far with reference to the preferred embodiments, the present invention is not limited to the above-mentioned embodiments but may, be changed variously without departing from the gist of the invention.

For example, while two OSs are operated in the electronic computer system as described above, more than three OSs may be operated. Incidentally, in that case, input-output arrangement information may be created for each OS, and the input-output request from each OS may be executed by using the input-output arrangement information. Alternatively, input-output arrangement information may be created for some OSs of a plurality of OSs, and with respect to other OSs, the input-output request from each OS may be executed by using the thus created input-output arrangement information commonly.

Further, while the electronic computer system includes one or two IOPs as described above, the electronic computer system according to the present invention may include many more IOPs.

According to the present invention, since the input-output arrangement information is prepared at every OS, the correspondence table showing a correspondence relationship between each OS and each input-output arrangement information is prepared, and the system can select and use the input-output arrangement information relative to the input-output request from an arbitrary OS, one electronic computer system becomes able to use a plurality of input-output arrangement information simultaneously. Accordingly, when a plurality of OSs are operated, if the input-output information is used at every OS, then the input-output arrangement that can be defined as the input-output arrangement information can be assigned to every OS. Also, when many more input-output arrangements are provided in the system, all OSs which are operated in the system become able to use the increased input-output arrangements so that the input-output arrangement can be changed freely.

INDUSTRIAL APPLICABILITY

The present invention is for use with a computer system in which a plurality of operating systems are operated in a single system, and is particularly suitable for a general-purpose computer, a parallel computer, a workstation and the like.

What is claimed is:

1. An electronic computer system in which a plurality of operating systems are operated; including a central processing unit for executing a variety of instructions, a plurality of channels being controlled by said central processing unit and a plurality of input-output units being connected to an arbitrary channel of said plurality of channels; said electronic computer system executing an input-output processing based on input-output arrangement information which defines an input-output arrangement; characterized in that said central processing unit includes storage means for storing a plurality of input-output arrangement information created in response to more than two operating systems in said plurality of operating systems, supervising means for supervising whether said plurality of operating systems issue an input-output request or not, first recognizing means for identifying an arbitrary one of said operating systems when an input-output request is issued from said arbitrary operating system and recognizing said arbitrary operating system, second recognizing means for recognizing input-output arrangement information corresponding to said operating system, and input-output executing means for executing an input-output processing based on said recognized input-output arrangement information stored in said storing means.

2. An electronic computer system as claimed in claim 1, characterized in that said storage means stores a correspondence table indicative of a correspondence relationship between each operating system and each input-output arrangement information, and said second recognizing means recognizes input-output arrangement information corresponding to an operating system which issues an input-output request based on said correspondence table.

3. An electronic computer system as claimed in claim 1, characterized in that said input-output arrangement information contains an I/O table provided at each of said input-output unit for specifying each input-output unit, and a CH table provided at each of said plurality of channels for specifying each channel.

4. An electronic computer system as claimed in claim 3, characterized in that said I/O table stores state information indicative of the state in which each input-output unit is in use, address information indicative of an address assigned to each input-output un it, connection information indicative of a connection relationship between each input-output unit and each channel, and flag information indicating whether each I/O table is valid or not, and said CH table stores address information indicative of an address assigned to each CH and characteristic information indicative of a characteristic of each CH.

5. An electronic computer system as claimed in claim 3, characterized in that said input-output executing means specifies an input-output unit designated by an operating system which issues an input-output request based on said I/O table, and includes I/O identifying means for identifying a channel to which said input-output unit is connected, CH selecting means for selecting a channel used in an input-output processing from said identified channels, and I/O activating means for activating said specified input-output unit through said selected channel.

6. An electronic computer system as claimed in claim 1, characterized in that said storage means stores a plurality of input-output arrangement information created in response to each of said plurality of operating systems, and said input-output executing means executes an input-output processing based on different input-output arrangement information relative to an input-output request from each operating system.

7. An electronic computer system in which a plurality of operating of operating systems are operated comprising an instruction processor for executing a variety of instructions, an input-output processor for executing an input-output instruction, a main storage for storing programs and processed data, a plurality of channels controlled by said input-output processor and a plurality of input-output units connected to an arbitrary channel of said plurality of channels; in which system said input-output processor executes an input-output processing based on input-output arrangement; said electronic computer system characterized in that said main storage has a control information storage area which stores a plurality of input-output arrangement information created in response to more than two operating systems of said plurality of operating systems, said instruction processor includes supervising means for supervising whether an input-output request is issued from said plurality of operating systems or not, and instructing means for identifying an arbitrary one operating system when an input-output request is issued from said operating system and instructing an input-output processing to said input-output processor, and said input-output processor includes recognizing means for recognizing input-output arrangement information corresponding to the operating system which issues an input-output request in response to an instruction from said instruction processors and input-output executing means for executing an input-output processing based on said recognized input-output arrangement information stored in said control information storage area.

8. An electronic computer system as claimed in claim 7, characterized in that said control information storage area stores a correspondence table indicative of a correspondence relationship between each operating system and each input-output arrangement information, and said recognizing means recognizes input-output arrangement information corresponding to the operating system which issues said input-output request based on said correspondence table.

9. An electronic computer system as claimed in claim 7, characterized in that said input-output arrangement information contains an I/O table provided at each of said plurality of input-output units for specifying each input-output unit, and a CH table provided at each of said plurality of channels for specifying each channel.

10. An electronic computer system as claimed in claim 9, characterized in that said I/O table stores state information indicative of a state in which each input-output unit is in use, address information indicative of an address assigned to each input-output unit, connection information indicative of a connection relationship between each input-output unit and each channel, and flag information indicative of whether each I/O table is valid or not, and said CH table stores address information indicative of an address assigned to each CH and characteristic information indicative of a characteristic of each CH.

11. An electronic computer system as claimed in claim 9, characterized in that said input-output executing means specifies an input-output unit designated by an operating system which issues said input-output request based on said I/O table, and includes I/O identifying means for identifying a channel to which said input-output unit is connected, CH selecting means for selecting a channel used in an input-output processing from said identified channels, and I/O activating means for activating said specified input-output unit through said selected channel.

12. An electronic computer system as claimed in claim 8, characterized in that said electronic computer system further includes a service processor for setting system arrangement information and the like, and said service processor includes a file which stores a plurality of input-output arrangement information created in response to more than two operating systems of said plurality of operating systems, and information storing means for storing said plurality of input-output arrangement information stored in said file in said control information storage area when said electronic computer system is started to operate or an initial microprogram is loaded.

13. An electronic computer system as claimed in claim 12, characterized in that said service processor further includes means for creating a correspondence table indicative of a correspondence relationship between each operating system and each input-output arrangement information, and said information storing means stores said correspondence table in said control information storage area as common information when said electronic computer system is started to operate or an initial microprogram is loaded.

14. An electronic computer system as claimed in claim 7, characterized in that said control information storage area stores a plurality of input-output arrangement information created in response to each of said plurality of operating system, and said input-output executing means executes an input-output processing based on different input-output arrangement information relative to an input-output request from each operating system.

15. An input-output processing method of an electronic computer system in which a plurality of operating systems are operated; including a central processing unit for executing a variety of instructions, a plurality of channels controlled by said central processing unit, a plurality of input-output units connected to an arbitrary channel of said plurality of channels, and storage means provided at said central processing unit for storing input-output arrangement information which defines an input-output arrangement; in which system said central processing unit executes an input-output processing based on said input-output arrangement information: characterized by comprising the steps of creating a plurality of input-output arrangement information in response to more than two operating systems in said plurality of operating systems, storing said plurality of input-output arrangement information in said storage means, supervising whether an input-output request is issued from said plurality of operating systems or not, identifying an arbitrary one operating system when an input-output request is issued from said operating system, recognizing an input-output arrangement information corresponding to said operating systems and executing an input-output processing based on said recognized input-output arrangement information.

16. An input-output processing method of an electronic computer system according to claim 15, characterized by further comprising the steps of creating a correspondence table indicative of a correspondence relationship between each operating system and each input-output arrangement information, storing said correspondence table in said storage means, and recognizing input-output arrangement information corresponding to said operating system based on said correspondence table when an input-output request is issued from an arbitrary operating system.

17. An input-output processing method of an electronic computer system according to claim 15, characterized by further comprising the steps of creating an I/O table used to specify each input-output unit for each of said plurality of input-output units, and creating a CH table used to specify each channel for each of said plurality of channels when said input-output arrangement information is created.

18. An input-output processing method of an electronic computer system according to claim 17, characterized by further comprising the steps of specifying an input-output unit designated by said operating system which issues an input-output request based on an I/O table within said input-output arrangement information, identifying a channel to which said specified input-output unit is connected, selecting a channel used in an input-output processing from said identified channels, and activating said specified input-output processing unit through said selected channel.

19. An input-output processing method of an electronic computer system according to claim 15, characterized by further comprising the steps of creating a plurality of input-output arrangement information in response to each of said plurality of operating systems, and executing an input-output processing based on different input-output arrangement information relative to an input-output request from each operating system.

* * * * *